United States Patent

Jain et al.

[11] Patent Number: 6,113,869
[45] Date of Patent: Sep. 5, 2000

[54] PROCESS FOR ARGON PURIFICATION

[75] Inventors: Ravi Jain, Bridgewater; James K. Tseng, Berkeley Heights, both of N.J.

[73] Assignee: The BOC Group, Inc., Murray Hill, N.J.

[21] Appl. No.: 08/719,832

[22] Filed: Sep. 30, 1996

[51] Int. Cl.[7] .............................. B01D 53/46; B01D 53/62
[52] U.S. Cl. ......................... 423/219; 423/247; 423/248; 423/262
[58] Field of Search ..................................... 423/219, 262, 423/247, 248

[56] References Cited

U.S. PATENT DOCUMENTS

| | | | |
|---|---|---|---|
| 4,239,509 | 12/1980 | Bligh et al. | |
| 4,579,723 | 4/1986 | Weltmer et al. | 423/219 |
| 4,713,224 | 12/1987 | Tamhankar et al. | 423/219 |
| 4,816,237 | 3/1989 | Tomomura | 423/262 |
| 4,983,194 | 1/1991 | Hopkins et al. | 423/219 |
| 5,100,446 | 3/1992 | Wisz | 423/262 |
| 5,106,399 | 4/1992 | Fisher | 423/262 |
| 5,202,096 | 4/1993 | Jain | 423/248 |
| 5,204,075 | 4/1993 | Jain et al. | 423/219 |

*Primary Examiner*—Tom Dunn
*Assistant Examiner*—Peter DiMauro
*Attorney, Agent, or Firm*—Philip H. Von Neida; Salvatore P. Pace

[57] ABSTRACT

An argon gas stream containing hydrogen, carbon monoxide, water vapor, oxygen carbon dioxide, nitrogen and methane is purified by drying the gas stream with a desiccant, oxidizing the hydrogen and carbon dioxide to water vapor and carbon dioxide by contact with oxidizing catalysts in the presence of excess oxygen, removing the water vapor and carbon dioxide from the gas stream by adsorption, removing excess oxygen by chemisorption at elevated temperature and removing the nitrogen and methane by adsorption at cryogenic temperature. Alternatively, excess oxygen is removed from the gas stream by adsorption at a cryogenic temperature.

21 Claims, 2 Drawing Sheets

PROCESS FOR ARGON PURIFICATION

FIELD OF THE INVENTION

This invention relates to the purification of inert gases, and more particularly to the removal of trace amounts of atmospheric gas impurities from an argon gas stream. In particular, the process comprises removing water vapor from the gas stream, then converting one or both of carbon monoxide and hydrogen in the gas stream to carbon dioxide and water vapor, respectively, then removing the water vapor and/or carbon dioxide, then removing oxygen, and one or both of nitrogen and methane from the gas stream. The water vapor, carbon monoxide, hydrogen, carbon dioxide and oxygen are removed from the gas stream at ambient temperature or higher, and the nitrogen and methane are removed at cryogenic temperature.

BACKGROUND OF THE INVENTION

Inert gases, such as argon, are used in many chemical and electronic component manufacturing processes to provide an inert atmosphere for carrying out these processes. For example, in the production of ultra high purity silicon crystals it is necessary that certain operations of the crystal manufacturing process be carried out in a completely inert atmosphere. Because of their substantially nonreactive nature, noble gases are the most suitable gases for such processes. Since argon is the most abundant and least inexpensive of the noble gases, it is usually preferred for use as the inert gas in these processes. However, the relatively high cost of argon makes it generally necessary to recover and reuse the argon. Unfortunately, certain operations in the manufacturing process, particularly in the argon recovery procedure, for example vacuum evacuation of manufacturing chambers, result in the infiltration of atmospheric impurities into the argon. These impurities and the impurities produced during the processes must be removed before the argon can be reused in the manufacturing operations.

Various techniques have been employed in the purification of argon. For example, U.S. Pat. No. 5,106,399, teaches a multiple step process for removing one or more of oxygen, nitrogen, water vapor, hydrogen, carbon monoxide, carbon doixide and hydrocarbon impurities from an argon feed stream. According to the process disclosed in this patent, water vapor and/or carbon dioxide are removed from the feed stream at ambient temperature by adsorption, oxygen, hydrogen and/or carbon monoxide are then removed by ambient temperature chemisorption using a catalytic material, and nitrogen and/or hydrocarbon are removed from the gas stream by absorption at cryogenic temperatures. A disadvantage of the process disclosed in this patent is that, if there are more than trace concentrations of oxygen, hydrogen and carbon monoxide in the feed stream, a large bed of catalytic material must be used for the chemisorption of these gases.

Japanese Patent Documents JP62119104 JP94024962 disclose the removal of oxygen from an argon gas stream by first adding hydrogen to the gas stream, then catalytically reacting the oxygen and hydrogen to form water, then contacting the gas stream with a copper oxide catalyst to convert carbon monoxide and excess hydrogen to carbon dioxide and water, respectively, and then removing water, carbon dioxide and nitrogen from the gas stream by pressure swing adsorption. This leads to low recovery of the argon.

Japanese patent document JP 89-102315 discloses the removal of carbon monoxide from an argon gas stream by catalytically oxidizing the carbon monoxide with oxygen, removing oxygen from the gas stream by reacting it with hydrogen, removing the resulting carbon dioxide and water vapor from the gas stream by adsorption and further purifying the argon by cryogenic fractional distillation.

U.S. Pat. Nos. 5,110,569 and 5,202,096, issued to Jain, disclose purifying an air stream containing carbon monoxide, hydrogen, carbon dioxide and water vapor by removing water vapor from the gas stream by adsorption, then oxidizing the carbon monoxide to carbon dioxide with oxygen in the presence of a metal oxide catalyst, then oxidizing the hydrogen to water vapor with oxygen in the presence of a noble metal catalyst, and finally, removing the resulting carbon dioxide and water vapor from the gas stream by adsorption. The disclosures of these patents are incorporated herein by reference and made a part of this specification.

Japanese patent disclosure Kokai 256418/92 discloses a catalytic procedure for removing carbon monoxide, hydrogen, carbon dioxide, water vapor and oxygen from an inert gas stream. The disclosure of this patent is incorporated herein by reference.

U.S. Pat. Nos. 4,239,509 and 5,159,816 disclose the separation of nitrogen and oxygen from an argon gas stream by cryogenic adsorption comprising passing the gas stream through nitrogen-selective adsorbent, such as zeolite 5A, and then passing the gas stream through an oxygen-selective adsorbent, such as zeolite 4A.

SUMMARY OF THE INVENTION

The present invention is generally directed to a process for producing a substantially pure inert gas stream from a feed stream containing the inert gas and water vapor, carbon dioxide, possibly oxygen, one or both of carbon monoxide and hydrogen, and one or both of nitrogen and methane, and is particularly directed to the treatment of feed streams which contain more than minute amounts of such impurities. The process comprises first removing water vapor, if present, from the feed stream; contacting the dried feed stream with one or more oxidation catalysts in the presence of a stoichiometric excess of oxygen to thereby convert any carbon monoxide and hydrogen present to carbon dioxide and water vapor, respectively; then removing any water vapor and carbon dioxide formed in the oxidation step from the stream; then removing excess oxygen from the stream and finally removing any nitrogen and/or methane from the gas stream. The resulting gaseous product is substantially free of these impurities, i.e. it generally contains no more than about one part per million by volume (ppm) of each of these impurities.

In a broad embodiment, the invention comprises a method of purifying an inert gas stream containing water vapor, one or both of carbon monoxide and hydrogen and one or both of nitrogen and methane comprising the steps:

(a) removing water vapor from the gas stream by contacting it with a dessicant;

(b) contacting the gas stream from step (a) with an oxidation catalyst selected from metal oxide catalyst, noble metal catalyst and mixtures of these in the presence of oxygen in excess of the amount necessary to oxidize all carbon monoxide and hydrogen in the gas stream to carbon dioxide and hydrogen, thereby producing a substantially carbon monoxide- and hydrogen-free gas stream;

(c) removing water vapor and/or carbon dioxide produced in step (b) from the gas stream by contacting the gas stream with water-selective and/or carbon dioxide-selective adsorbent, thereby producing a substantially water vapor-free and carbon dioxide-free gas stream (d) removing excess oxygen from the substantially water vapor-free and carbon dioxide-free gas stream by (1) chemisorption with a metal agent at a temperature of at least 75° C., (2) contacting the gas stream with an oxygen-selective adsorbent at a temperature in the range of about 123 K to 93 K, or by a combination of (1) and (2); and (e) adsorbing nitrogen and/or methane from the gas stream by contacting the gas stream with an adsorbent selected from A zeolites, X zeolites, mordenites and combinations thereof at a temperature in the range of about 173 K to 90 K.

The method of the invention is particularly useful for purifying argon as the inert gas.

In a preferred embodiment the desiccant used in step (a) is selected from the group consisting from silica gel, alumina, zeolite A, zeolite X and mixtures of these.

Oxygen is added to the gas stream when necessary to provide an amount of oxygen in the gas stream in excess in the amount necessary to oxidize all carbon monoxide and hydrogen in the gas stream.

In a preferred embodiment, carbon monoxide in the gas stream is oxidized with a metal oxide selected from the group consisting of nickel oxide, copper oxide, manganese dioxide and mixtures of these. In a more preferred embodiment, the metal oxide is supported on a porous substrate. In a still more preferred embodiment, the metal oxide catalyst is a mixture of copper oxide and manganese dioxide.

In another preferred embodiment, hydrogen in the gas stream is oxidized with a noble metal catalyst selected from the group consisting of palladium, platinum and mixtures of these. In a more preferred embodiment, the noble metal catalyst is supported on a porous substrate. In a still more preferred embodiment, the noble metal catalyst is palladium supported on alumina.

Preferably, the water-selective adsorbent used in step (c) is selected from silica gel, alumina, zeolites and mixtures of these.

Preferably, the carbon dioxide-selective adsorbent used in step (c) is a zeolite selected from zeolite 5A, zeolite 13X, activated alumina, and mixtures of these.

In one preferred embodiment of the invention, step (d) is carried out by chemisorption using a metal agent selected from the group consisting of reduced copper; nickel and mixtures of these. In this preferred embodiment, step (e) preferably follows step (d).

Preferably, steps (a) to (c) are carried out in a first vessel and step (d) is carried out in a second vessel.

In another preferred embodiment the metal agent used in step (d) (1) is regenerated by contacting it with hydrogen regeneration gas at a temperature in the range of about 150 to about 300° C. Preferably, the hydrogen regeneration gas comprises a mixture of hydrogen and nitrogen. Most preferably, the hydrogen regeneration gas comprises about 10 volume percent hydrogen and about 90 volume percent nitrogen. Preferably, following regeneration of the metal agent with hydrogen regeneration gas stream, the regenerated metal agent is purged with argon.

Preferably, the metal agent used in step (d) (1) is supported on a porous substrate. More preferably, the metal agent is copper supported on alumina.

In another preferred embodiment of the invention, step (d) (2) is carried out by contacting the gas stream with an adsorbent selected from 4A zeolite, small pore mordenites, small pore clinoptilolites, zeolite L, chabazite and mixtures of these. In this embodiment, step (d) follows step (e).

In a preferred embodiment, the adsorbent used in step (e) is 13X zeolite, calcium-exchanged type X zeolite, 5A zeolite, large pore mordenite, large pore clinoptilolite, or mixtures of these.

BRIEF DESCRIPTION OF THE DRAWINGS

The invention is illustrated in the appended drawings, of which.

In the various figures like reference characters are used to designate like parts. Valves, lines and equipment that are not necessary for an understanding of the invention have not been included in the drawings.

DETAILED DESCRIPTION OF THE INVENTION

The process of the present invention produces a highly purified inert gas product with regard to carbon monoxide, carbon dioxide, hydrogen, water vapor, nitrogen and methane. The inert feed gas purified herein contains at least one impurity of carbon monoxide and hydrogen. Carbon dioxide and water vapor may also be present in the initial feed stream, or they may be generated during the oxidation steps of the process. The feed stream may also initially contain oxygen. It is necessary that the feed stream contain sufficient oxygen for the complete catalytic conversion of all carbon monoxide and hydrogen present in the inert gas feed stream. In the event that the feed stream entering the oxidation step does not contain sufficient oxygen to accomplish this result, oxygen, in the form of air, oxygen-enriched air or, substantially pure oxygen, is added thereto. Since, in general, it is necessary to add only very small quantities of oxygen to the feed gas to ensure a stoichiometric excess of oxygen relative to the amounts of carbon monoxide and hydrogen in the feed stream, the amount of nitrogen introduced when air or oxygen-enriched air is added to the feed gas will not be great, and the introduced nitrogen can be easily removed during the nitrogen removal step of the process.

As used in the specification and claims, "oxygen-enriched air" means air that contains more oxygen than is ordinarily present in atmospheric air; "substantially pure oxygen" means oxygen that contains not more than about 0.1% of gaseous impurities; "ambient temperature" means a temperature in the range of about −30 to about +50° C.; and "cryogenic temperature" means a temperature below about 175 K.

Figure 1:
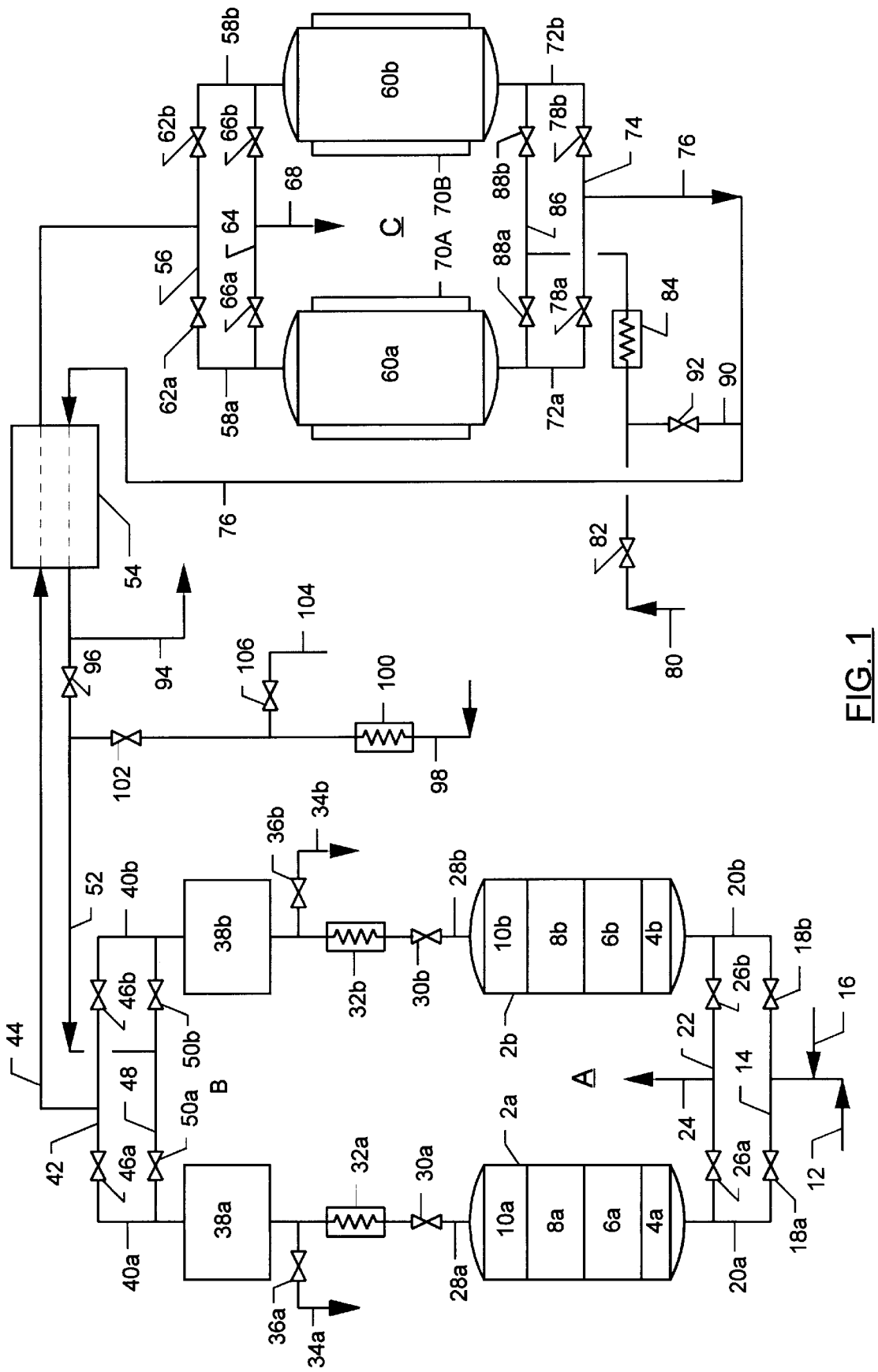
FIG. 1 is a schematic representation of one embodiment of the invention.

Referring to the drawings, and particularly to FIG. 1, there is shown therein a system for the removal of carbon monoxide, hydrogen, water vapor, carbon dioxide and oxygen at or above ambient temperature, and the removal of nitrogen and methane at cryogenic temperature. The system of FIG. 1 includes, as separate entities, an adsorption/oxidation section, A, an oxygen removal section B and a cryogenic adsorption section, C. These sections are illustrated in the drawings as comprising pairs of units arranged in parallel, the units of each pair being adapted to be operated alternately, with one unit of each pair being used for gas purification while the other unit is being regenerated. However, each section may comprise a single unit, operated intermittently, or three or more units operated consecutively, simultaneously or in pairs.

The various treatment zones of each unit of oxidation section A are preferably incorporated into single vessels, 2a and 2b, as illustrated in the figures; however, they may be housed in separate vessels, if desired. In the system illustrated in FIG. 1, vessels 1a and 1b respectively contain gas drying zones 4a and 4b positioned adjacent the gas inlets to the vessels, carbon monoxide oxidation zones 6a and 6b positioned downstream of drying zones 4a and 4b, respectively, hydrogen oxidation zones 8a and 8b positioned downstream of carbon dioxide oxidation zones 6a and 6b, and water vapor and carbon dioxide removal zones 10a and 10b positioned downstream of hydrogen oxidation zones 8a and 8b, respectively.

Drying zones 4a and 4b comprise one or more beds of desiccant for removing water vapor from the feed gas stream. Any adsorbent which preferentially adsorbs water from the gas stream can be used in zones 4a and 4b. Suitable adsorbents include silica gel, alumina and zeolites. Preferred adsorbents are silica gel, alumina and zeolites A and X.

Carbon monoxide oxidation zones 6a and 6b contain one or more catalysts which effect the oxidation of carbon monoxide to carbon dioxide at ambient temperature and in the presence of oxygen. Typical carbon monoxide oxidation catalysts include transition metal oxides, such as nickel oxide, copper oxide, manganese oxide, cobalt oxide, etc., or mixtures of two or more of these transition metal oxides. Suitable transition metal oxides include Hopcalite, a composition containing copper and manganese oxides, with a copper content of about 10.8 weight %, a manganese content of about 52.4 weight % and the balance oxygen; a transition metal composition sold by Carus Chemical Co. under the trade designation Carulite, comprising a mixture of copper and cobalt oxides and Harshaw oxidized nickel catalyst. Noble metal catalysts, such as platinum or palladium may also be used to effect the oxidation of carbon monoxide to carbon dioxide in the presence of oxygen.

Hydrogen oxidation zones 8a and 8b contain one or more catalysts that oxidize hydrogen to water vapor at ambient temperature in the presence of oxygen. Preferred hydrogen oxidation catalysts include the noble metal catalysts, such as palladium, platinum, rhodium, etc., or mixtures of these. Preferred noble metal catalysts are platinum and palladium. The noble metal catalyst is preferably supported on a porous substrate, such as alumina.

Although both carbon monoxide and hydrogen contained in the feed gas can be oxidized using a single catalyst, such as a noble metal catalyst, it is preferred to provide separate oxidation sections for the carbon monoxide and hydrogen oxidation steps, with the carbon monoxide oxidation step preceding the hydrogen oxidation step, since carbon monoxide may cause degradation of the noble metal catalyst. The preferred arrangement is a carbon monoxide oxidation zone using a mixed copper oxide-manganese oxide catalyst followed by a hydrogen oxidation zone using platinum or palladium or mixtures platinum and palladium, supported on an alumina substrate.

Zones, 10a and 10b serve the purpose of removing from the gas stream carbon dioxide and water vapor formed during the oxidation of carbon monoxide and hydrogen, respectively. The water vapor and carbon dioxide can be removed by use of a single adsorbent which adsorbs both water vapor and carbon dioxide, such as type A and X zeolites, or it may contain separate adsorbents for water vapor and carbon dioxide, either in the form of separate layers or in the form of a single mixed layer of the two adsorbents. Suitable water vapor adsorbents are those described above for use in zones 4a and 4b. Suitable carbon dioxide adsorbents include type A and type X zeolites, such as zeolite 5A and zeolite 13 X and activated aluminas such as Selexsorb COS and H-156 (available from Alcoa). Since water vapor is generally more rapidly adsorbed than is carbon dioxide or zeolite adsorbents, it is generally preferable to provide separate layers of water vapor adsorbent and carbon dioxide adsorbent, to prevent preferential adsorption of water vapor on the adsorbent intended for carbon dioxide adsorption.

Feed gas inlet line 12, positioned on the inlet end of vessels 2a and 2b, is connected to inlet gas manifold 14. Oxygen supply line 16 is connected to line 12, upstream of manifold 14. Manifold 14 is provided with valves 18a and 18b, which control feed to vessels 2a and 2b through lines 20a and 20b, respectively. Purge gas outlet manifold 22, provided with vent line 24, is connected to inlet lines 20a and 20b. Flow between lines 20a and 20b and vent line 24 is controlled by valves 26a and 26b, respectively. Outlet lines 28a and 28b, fitted with valves 30a and 30b, are connected to the outlet ends of vessels 2a and 2b, respectively. Lines 28a and 28b pass through optional heater units 32a and 32b, respectively, and purge gas outlet lines 34a and 34b, fitted with valves 36a and 36b, are connected to lines 28a and 28b downstream of heaters 32a and 32b. The downstream ends of lines 28a and 28b are connected to the inlet end of oxygen chemisorption units 38a and 38b, which are located in oxygen removal section B.

Oxygen chemisorption units 38a and 38b contain a catalyst which chemisorbs oxygen from gas passing through them. The preferred catalyst is a copper-based substance. Particularly preferred catalysts are those which are supported on porous substrates, such as alumina. A suitable alumina-supported copper catalyst is sold by Engelhard. The outlet ends of units 38a and 38b are connected to product gas lines 40a and 40b, which in turn are connected to product gas manifold 42. Gas discharge line 44 is connected to manifold 42. Flow between lines 40a and 44 and between lines 40b and 44 is controlled by valves 46a and 46b, respectively, which are located in manifold 42. Section B purge gas manifold 48, fitted with valves 50a and 50b, is connected to lines 40a and 40b. Section B purge gas line 52 is connected to manifold 48 between valves 50a and 50b. Flow between lines 40a and 52 and between lines 40b and 52 is controlled by valves 50a and 50b, respectively.

Line 44 passes through cryogenic heat exchanger 54 and is connected to feed gas inlet manifold 56 of cryogenic adsorption section C. Manifold 56 is connected to Inlet gas feed lines 58a and 58b, which in turn are connected to the inlet ends of adsorption vessels 60a and 60b. Valves 62a and 62b, located in manifold 56, control flow between line 44 and lines 58a and 58b, respectively. Section C purge gas outlet manifold 64 is joined to lines 58a and 58b. Manifold 64 is provided with valves 66a and 66b, and purge gas vent line 68 is connected to manifold 64 between valves 66a and 66b. Flow between lines 58a and 68 and between lines 58b and 68 is controlled by valves 66a and 66b, respectively.

Adsorption vessels 60a and 60b are packed with an adsorbent which selectively adsorbs nitrogen and methane, relative to the inert gas being purified. Suitable adsorbents include large pore mordenites, large pore clinoptilolites, type X zeolites, and zeolite 5A. Nitrogen- and methane-selective adsorbents which are preferred (because of their effectiveness and ready availability in commercial quantities) are type X zeolites, particularly zeolite 13X and calcium-exchanged zeolite, and zeolite 5A. Adsorption vessels 60a and 60b are provided with refrigeration means, shown in FIG. 1 as cooling jackets 70a and 70b. The outlet ends of vessels 60a and 60b are connected to purified gas discharge lines 72a and 72b, which, in turn, are joined to purified gas manifold 74. Purified gas product line 76 is joined to manifold 74. Manifold 74 is provided with valves 78a and 78b, which control flow of purified gas between lines 72a and 76 and between lines 72b and 76, respectively.

Section C nitrogen purge line 80, fitted with valve 82 and heater 84 is joined to manifold 86, between valves 88a and 88b. Purified argon purge gas line 90, provided with valve 92, permits gas to flow from line 76 to line 80.

Line 76 passes through cryogenic heat exchanger 54 and then joins purified gas discharge line 94. Line 76 is also connected to Section B purge gas line 52. Flow between lines 76 and 52 is controlled by valve 96, positioned in line 52.

Nitrogen purge gas supply line 98, provided with heater unit 100 and, downstream of heater 100, valve 102, is connected to line 52, at a point between valve 96 and manifold 48. Hydrogen regeneration gas line 104, fitted with valve 106 is joined to line 98 between heater 100 and valve 102.

In practicing the process of the invention in the system illustrated in FIG. 1, an inert gas feed stream, as for example argon effluent from a silicon chip manufacturing unit, is introduced into the system via line 12. The feed gas stream may pass through a compressor (not shown) wherein the gas is compressed, for example to a pressure in the range of about 75 to 150 psig. The compressed gas stream can then be passed through a heat exchanger (not shown) wherein it is cooled sufficiently to condense some of the moisture that may be contained in the gas stream. The cooled gas stream can then be passed through a water separator (not shown) to remove liquid water therefrom. These preliminary units are not shown because their use is optional and depends upon the quality of the inert gas feed stream. The feed gas stream, now usually at a temperature in the range of about 5. to about 50° C., enters section A through manifold 14. Prior to its introduction into section A sufficient oxygen is added to the feed gas stream to ensure that the total oxygen content in the feed gas is in excess of the amount needed to completely oxidize all carbon monoxide and hydrogen contained in the feed stream.

The process will be described first in the half-cycle in which units 2a, 38a and 60a are the adsorption mode and units 2b, 38b, and 60b are being regenerated, and then in the half-cycle in which units 2b, 38b and 60b are the adsorption mode and units 2a, 38a, and 60a are being regenerated. The regeneration of sections A and B will be conducted in three steps, a section B catalyst regeneration step, a section A and section B nitrogen purge step and a section A and section B argon gas purge step.

Since sections A and B are operated as a single unit during the adsorption phase of the cycle, the corresponding vessels of sections A and B are regenerated together. However, the vessels of section C will generally be on a different cycle than those of sections A and B, and it can be appreciated that section C can be regenerated independently of the regeneration of the vessels in sections A and B. However, to simplify explanation of the operation of the process, it will be assumed that the half-cycles of sections A and B are in exact synchronization with the half-cycle of section C.

In the first part of this half cycle valves 18a, 30a, 36b, 46a, 50b, 62a, 66b, 78a, 82, 88b, 102 and 106 are open and all other valves are closed.

The feed gas passes through line 20a and into vessel 2a. As it passes through zone 4a, substantially all moisture in the gas stream is adsorbed by the desiccant contained in this zone. The gas may be heated somewhat by the adsorption step, the extent of the heating depending upon the amount of water vapor contained in the stream. The feed gas next passes through zone 6a, wherein substantially all carbon monoxide in the gas is oxidized to carbon dioxide upon contact with the catalyst contained in this zone. The gas may be further heated as it passes through zone 6a, again the extent of the heating being dependent upon the amount of carbon monoxide contained in the gas stream. Next, the feed gas passes through zone 8a, wherein any hydrogen in the gas reacts with oxygen to form water upon contact with the catalyst contained in this zone. If any hydrogen is present in the gas, the gas will be further heated. The gas stream next passes through the adsorbent contained in zone 10a and is depleted of water vapor and carbon dioxide produced in zones 8a and 10a. The zone 10a adsorption step further heats the feed gas, the extent of heating depending upon the amount of water vapor and carbon dioxide contained in the gas.

The gas stream, now substantially free of carbon monoxide, hydrogen, carbon dioxide and water vapor, leaves section A through line 28a. The gas stream passes through heater 32a, wherein it is further heated, if necessary to a temperature of at least 75° C. and then it enters section B. This increases the oxygen chemisorption capacity of bed 38a substantially. As the gas passes through the metal catalyst in vessel 38a substantially all oxygen remaining in the gas is removed therefrom. The gas then passes out of section B through lines 40a and 44.

The gas stream next passes through cryogenic heat exchanger 54 wherein it is cooled to a temperature in the range of about 173 K to about 90 K by heat exchange with cold purified argon leaving section C. The chilled gas then passes through lines 56 and 58a and enters vessel 60a. Vessel 60a is chilled by refrigeration means 70a so that the temperature in this vessel remains in the range of about 173 K to about 90 K. As the chilled gas passes through vessel 60a substantially all nitrogen and methane contained in the gas is removed therefrom. The purified argon leaves vessel 60a through lines 72a, 74 and 76, passes through heat exchanger 54 and is sent to storage for reuse via line 94.

During the first part of the first half-cycle vessel 38b undergoes regeneration. To accomplish this an inert gas, preferably nitrogen, is introduced into the system through line 98. The nitrogen is heated in heater 32b to a temperature sufficiently high that when it is mixed with the desired amount of hydrogen, the gas mixture will have a temperature in the range of about 150 to about 300° C. Hydrogen is introduced into the hot nitrogen stream at a rate to produce a gas mixture containing about 10% hydrogen by volume. The hot hydrogen regeneration gas mixture passes through lines 52, 48 and 40b and flows counter currently through vessel 38b, wherein the hydrogen in the gas stream reduces the oxidized metal catalyst in vessel 38b, thereby producing moisture. The moisture and regeneration gas stream pass out of vessel 38 and leaves the system through line 34b, after which it is used as fuel or released to the atmosphere. When the catalyst in vessel 34b is regenerated, valves 106 and 36b are closed and valves 26b and 30b are opened. Hot nitrogen now passes counter currently through vessels 38b and 2b, thereby regenerating the adsorbents in zones 10b and 4b. The regeneration gas, together with the water vapor and carbon dioxide desorbed from beds 10b and 4b, is discharged from the system through line 24.

When regeneration of the adsorbent in zones 10b and 4b is finished, heater 100 is turned off and unheated nitrogen is passed through vessels 38b and 2b to cool the contents of these vessels. When zones 10b and 4b are cooled to the desired extent, valve 102 is closed and valve 96 is opened. Purified argon from line 76 now passes through vessels 38b and 2b, thereby flushing nitrogen from these vessels. It is not necessary to remove all nitrogen from these beds because residual nitrogen will be passed to section C during the next half-cycle of the process and it will be removed from the gas stream therein. If desired some or all of the argon purge gas can be recycled to feed line 12 after it passes out of the system through line 24. Upon completion of the argon flush step the first half-cycle in sections A and B is complete and the regenerated vessels are ready to be put into gas purification service.

During the period that vessel 60a is in adsorption service vessel 60b is undergoing regeneration. To accomplish this, nitrogen is introduced into the system through line 80, passes through heater 84, wherein it is heated to a temperature in the range of about 25 to about 150° C. The heated gas then passes through lines 86 and 72b and counter currently through vessel 60b. As it passes through vessel 60b it desorbs nitrogen and methane from the adsorbent. The purge gas, together with desorbed nitrogen and methane, passes through lines 58b and 64 and leaves the system through line 68, after which it can be discharged to the atmosphere. When the adsorbent in vessel 60b is regenerated to the desired extent it is purged of nitrogen and cooled by opening valve 92 and closing valve 82 and permitting cold argon to pass through the vessel. The purged nitrogen and argon purge gas leave vessel 60b through line 68. Part or all of this stream may be recycled to line 44 for recovery of the argon purge gas, if desired, or it may be discharged to the atmosphere. After completion of the argon purge step vessel 60b is ready for adsorption service in the second half-cycle of the section C process.

As the first half-cycle proceeds, the adsorption fronts in zones 4a, 10a and 60a advance toward the exit end of these zones. At a predetermined point in the first half-cycle, determined usually when the adsorption front in one of the adsorption zones reaches a certain point in that zone, or when activity of the catalyst in vessel 38a reaches a certain extent, the first half-cycle is terminated and the second half cycle is begun. At this point, valves 18b, 30b, 36a, 46b, 50a, 62b, 66a, 78b, 82, 88a, 102 and 106 are open and all other valves are closed.

The second half-cycle of the process is identical to the first half cycle except that the phases conducted in the various vessels is reversed, such that, in the second half-cycle, those vessels that were in purification service in the first half-cycle will undergo regeneration and those vessels that were being regenerated will be in purification service.

Figure 2:
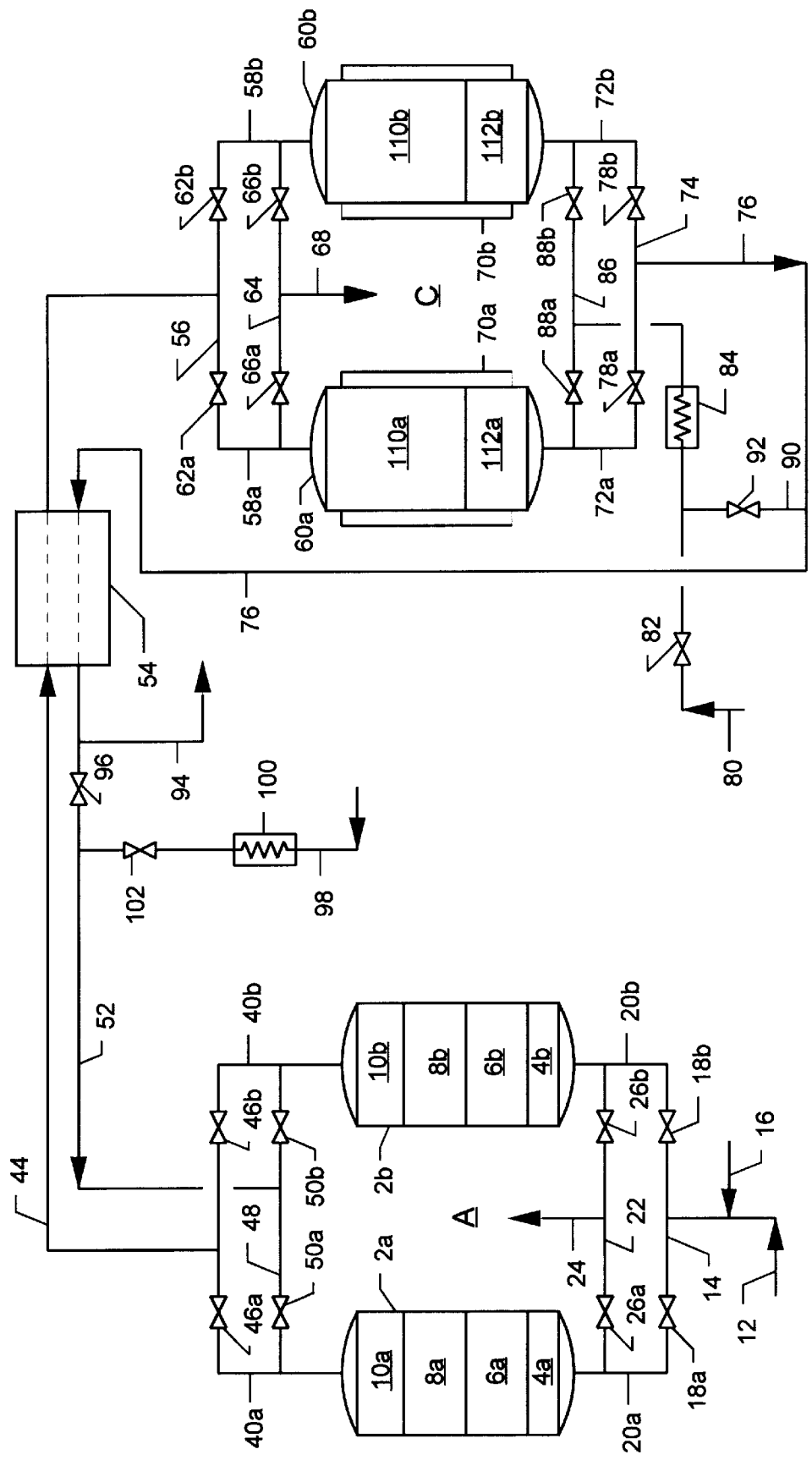
FIG. 2 is a schematic representation of another embodiment of the invention.

The system of FIG. 2 is similar to that of FIG. 1 except that excess oxygen is removed from the gas stream in section C instead of section B; accordingly, section B does not appear in the system of FIG. 2. Since section B has been eliminated, the hydrogen regeneration step is not necessary. Also, it is not necessary to heat the gas exiting section A, so heaters 32a and 32b have been eliminated.

In the FIG. 2 system, section C has been modified so that vessels 60a and 60b include a first layer of adsorbent which is selective for nitrogen and methane, layers 110a and 110b, respectively, and a second layer of adsorbent which is selective for oxygen, layers 112a and 112b, respectively. Layers 110a and 110b are the same adsorbents descussed above in the description of the FIG. 1 embodiment. Layers 112a and 112b generally comprise one or more adsorbents which selectively adsorb oxygen at cryogenic temperatures from the gas stream being purified. Adsorbents useful for this purpose include the oxygen-selective adsorbents discussed above, namely 4A zeolite, small pore mordenites, small pore clinoptilolites, zeolite L, chabazite and mixtures of these.

In the process of the invention as carried out in the system of FIG. 2, the gas stream depleted in carbon monoxide, hydrogen, carbon dioxide and water vapor which leaves vessels 2a and 2b passes directly to heat exchanger 54, where it is chilled to the desired cryogenic temperature. In the first half-cycle the gas stream then enters vessels 60a and passes through layer 110a. Nitrogen and methane are adsorbed by the adsorbent in this layer while argon and oxygen pass through the adsorbent substantially unadsorbed. The gas stream then passes through layer 112a wherein any oxygen in the gas stream is adsorbed. The purified argon gas stream then passes out of vessel 60a and leaves section C through line 76, as discussed in the description of the FIG. 1 system.

While vessel 60a is in adsorption service, the adsorbents in vessel 60b are regenerated by passing first nitrogen and then argon through the layers, as described above. The oxygen, nitrogen and methane from vessel 60b are disposed of in the manner discussed above.

In the second half-cycle in section C, layers 110b and 112b are in adsorption service while layers 110a and 112a are regenerated.

In the regeneration of the purification of zones 4a and 4b and 10a and 10b of section A, heated nitrogen is passed counter currently through vessels 2a and 2b the manner described in the second step of the regeneration procedure in the system of FIG. 1. The layers are then cooled with unheated nitrogen and finally purged with argon, all as described with respect to the operation of the system of FIG. 1

It will be appreciated that it is within the scope of the present invention to utilize conventional equipment to monitor and automatically regulate the flow of gases within the system so that it can be fully automated to run continuously in an efficient manner.

EXAMPLE 1

The experiments for CO, $H_2$ and $H_2O$ removal were carried out in a 5.345" I.D. reaction vessel. The feed CO and $H_2$ concentrations in argon were 1,500 ppm and 240 ppm, respectively, feed $CO_2$ concentration was 100 ppm, feed nitrogen concentration was 1,200 ppm, feed $CH_4$ concentration was 800 ppm and the feed was saturated with water vapor at 75 psig and 45° C. Activated alumina (Alcoa F-200, 3 mm size) was used for water removal. About 5 lbs of Carulite-300 from Carus Chemical and about 5 lbs of 0.5%-Pd-on-AA from Englehard were used for CO and $H_2$ oxidation, respectively. To this feed mixture, 2050 ppm was oxygen was added for the oxidation reaction. For a feed flow rate of 7 SCFM, the product CO concentration varied between 0 and 0.002 ppm and the product hydrogen concentration varied between 0 and 0.023 ppm. Hydrogen and CO concentrations were measured using RGA-3 Analyzer available from Trace Analytical. The product $H_2O$ concentration was less than 0.1 ppm. The amount of $CO_2$ exiting the second catalyst layer was 1.600 ppm.

EXAMPLE 2

The feed to the reaction vessel in the experiments of Example 1 was at 45° C. The gas exiting the second catalyst layer was at a temperature of about 75° C. The $CO_2$ adsorption capacity was determined at this temperature using argon containing 1,600 ppm $CO_2$ at 75° C., 75 psig using a NaX sieve from UOP (Des Plaines, Ill.). A $CO_2$ capacity of 1.78 wt % and a $CO_2$ mass transfer zone length of 16.5" were determined. The gas exiting the NaX layer contained less than 0.1 ppm $CO_2$.

EXAMPLE 3

The feed was the same as in Example 2. The feed contained 1600 ppm $CO_2$ at 75 psig and 75° C. The $CO_2$ adsorption capacity was determined at this temperature using using a Selexsor COS activated alumina of 7×12 mesh size from Alcoa (Pittsburgh, Pa.). A $CO_2$ capacity of 1.42 wt % and a $CO_2$ mass transfer zone length of 10.0" were determined. The gas exiting the Selexsor COS layer contained less than 0.1 ppm $CO_2$.

EXAMPLE 4

The gas mixture exiting the $CO_2$ adsorption layers of Examples 2 and 3 was sent to an oxygen chemisorbent (Englehard Cu-0825) in reduced form. The feed oxygen concentration was about 1,200 ppm at 75° C., and 75 psig. An oxygen capacity of about 3 wt % was obtained for this material. The product oxygen concentration varied between 0 and 50 ppb.

Comparative Example 1

A feed containing 240 ppm hydrogen at 75° C. and 75 psig was passed through a regenerated Harshaw Ni bed containing about 50 wt % nickel. The feed hydrogen concentration was same as in Example 1. However, instead of using a catalyst to oxidize hydrogen to water as in this invention, a getter material as suggested in U.S. Pat. No. 5,106,399 was used. Breakthrough capacity was determined for a 23" long bed for a product hydrogen concentration of 1 ppm. The breakthrough capacity was about 1.92 cc (STP) hydrogen/gm of nickel. For a six hour adsorption cycle, this capacity gives a quantity of nickel getter of well over 20 lbs for the feed conditions of Example 1. Only 5 lbs of the catalyst material is needed for hydrogen removal method of present invention. This clearly points out the advantage of using oxidation catalyst for hydrogen removal. Also, whereas the quantity of catalyst needed for the present invention does not go up significantly with the increase in feed hydrogen concentration, the amount of getter material needed is directly proportional to the feed hydrogen concentration. So, for higher feed hydrogen concentrations, much larger quantities of the getter material would be needed compared to the amount of oxidation catalyst.

EXAMPLE 5

The experiments were carried out using a small unit with a feed nitrogen concentration of 1,200 ppm and a feed methane concentration of 800 ppm. This is similar in composition to the gas mixture exiting the $CO_2$ adsorption layer in Examples 2 and 3. The adsorption vessel contained 1,593 gms of UOP CaX (8×12 mesh). The feed flow of 8.6 slpm, feed pressure of 70 psig and the feed temperature of −160° C. were used. Methane and nitrogen breakthroughs were monitored using Shimadzu GC-9A gas chromatograph with TCD detector and Gow-Mac GC with HID detector. Methane adsorption capacity and mass transfer zone (MTZ) were calculated using the methane breakthrough data. Methane adsorption capacity for of 9.06 wt % and the methane MTZ length of 2.5" were obtained. A nitrogen adsorption capacity of about 10 wt % and a nitrogen MTZ length of about 4" were obtained. The gas exiting this layer contained less than 0.1 ppm each of methane and nitrogen.

EXAMPLE 6

Experiments at conditions identical to those in Example 5 were carried out. The only difference was that the a bed containing 1,658 gms of UOP 13XAPG (8×12 mesh) was used instead of UOP CaX. Methane and nitrogen adsorption capacities of about 7.8 and 9.5 wt %, respectively were obtained. The gas exiting this layer contained less than 0.1 ppm each of methane and nitrogen.

EXAMPLE 7

The experiments were carried out using the 2.5" I.D. and 5' long vessel with a feed oxygen concentration of 0.12% oxygen. This is close to the oxygen concentration of the gas exiting the CaX or 13X layers of Examples 5 and 6, respectively. The adsorption vessel contained 1,780 gms of UOP 4A zeolite (8×12 mesh). For a feed flow rate of 22.9 slpm, an oxygen adsorption capacity of 3.89 wt % and an oxygen MTZ length of 2.93 ft were obtained. The product argon contained less than 0.1 ppm oxygen.

Although the invention has been described with particular reference to specific equipment configurations and to specific experiments, these are merely exemplary of the invention, and variations are contemplated. The scope of the invention is limited only by the breadth of the appended claims.

What is claimed is:

1. A method of purifying an inert gas stream containing water vapor, one or both of carbon monoxide and hydrogen and one or both of nitrogen and methane comprising the steps:

(a) removing water vapor from said gas stream and raising the temperature of the gas stream by contacting it with a desiccant;

(b) contacting the gas stream from step (a) with oxidation catalyst selected from the group consisting of metal oxide catalyst, noble metal catalyst and mixtures of these in the presence of oxygen in excess of the amount necessary to oxidize all carbon monoxide and hydrogen in said gas stream to carbon dioxide and water, thereby producing and further heating a substantially carbon monoxide- and hydrogen-free gas stream;

(c) removing water vapor and/or carbon dioxide from said gas stream from step (b) by contacting the gas stream with water-selective and/or carbon dioxide-selective adsorbent, thereby producing and further heating, a substantially water vapor-free and carbon dioxide-free gas stream (d) removing excess oxygen from said heated substantially water vapor-free and carbon dioxide-free gas stream by chemisorption with a metal agent at a temperature of at least 75° C.; and (e) adsorbing nitrogen and/or methane from said gas stream by contacting the gas stream with an adsorbent selective for nitrogen and methane at a temperature in the range of about 173 K and 93 K.

2. The method of claim 1, wherein said desiccant is selected from the group consisting from silica gel, alumina, zeolite A, zeolite X and mixtures of these.

3. The method of claim 1, wherein at least some of any carbon monoxide present in said inert gas stream is oxidized with a metal oxide selected from the group consisting of nickel oxide, copper oxide, manganese dioxide and mixtures of these.

4. The method of claim 3, wherein said metal oxide is supported on a porous substrate.

5. The method of claim 4, wherein said metal oxide catalyst is a mixture of copper oxide and manganese dioxide.

6. The method of claim 1 or claim 3, wherein at least some of any hydrogen present in said inert gas stream is oxidized with a noble metal catalyst selected from the group consisting of palladium, platinum and mixtures of these.

7. The method of claim 6, wherein said noble metal catalyst is supported on a porous substrate.

8. The method of claim 7 wherein said noble metal catalyst is palladium supported on alumina.

9. The method of claim 1, wherein the water-selective adsorbent used in step (c) is selected from the group consisting of silica gel, alumina, zeolites and mixtures of these.

10. The method of claim 1, wherein the carbon dioxide-selective adsorbent used in step (c) is selected from the group consisting of zeolite 5A, zeolite 13X, activated alumina and mixtures of these.

11. The method of claim 1, wherein step (d) is carried out by chemisorption using a metal agent selected from the group consisting of copper, nickel and mixtures of these.

12. The method of claim 11 wherein step (e) follows step (d).

13. The method of claim 11 wherein steps (a) to (c) are carried out in a first vessel and step (d) is carried out in a second vessel.

14. The method of claim 11 or claim 13, wherein said metal agent is regenerated by contacting it with hydrogen regeneration gas at a temperature in the range of about 150 to about 300° C.

15. The method of claim 14, wherein said hydrogen regeneration gas comprises a mixture of hydrogen and nitrogen.

16. The method of claim 15, wherein said hydrogen regeneration gas comprises 10 volume percent hydrogen and 90 volume percent nitrogen.

17. The method of claim 15, wherein the regenerated metal agent is purged with argon.

18. The method of claim 11 wherein said metal agent is supported on a porous substrate.

19. The method of claim 18, wherein said metal agent is copper supported on alumina.

20. The method of claim 1, wherein the adsorbent used in step (e) is selected from the group consisting of 13X zeolite, calcium-exchanged type X zeolite, 5A zeolite, large pore mordenite, large pore clinoptilolite, and mixtures of these.

21. The method of claim 1, wherein said inert gas is argon.

* * * * *